(12) United States Patent
Dong et al.

(10) Patent No.: US 11,108,132 B2
(45) Date of Patent: Aug. 31, 2021

(54) ANTENNA SYSTEM AND MOBILE TERMINAL USING SAME

(71) Applicant: AAC Technologies Pte. Ltd., Singapore (SG)

(72) Inventors: Kai Dong, Shenzhen (CN); Dawei Shi, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 189 days.

(21) Appl. No.: 16/438,470

(22) Filed: Jun. 12, 2019

(65) Prior Publication Data
US 2019/0386377 A1    Dec. 19, 2019

(30) Foreign Application Priority Data

Jun. 13, 2018  (CN) .......................... 201810604313.6

(51) Int. Cl.
| | |
|---|---|
| *H01Q 1/24* | (2006.01) |
| *H01Q 1/38* | (2006.01) |
| *H01Q 1/48* | (2006.01) |
| *H04M 1/02* | (2006.01) |
| *H04M 1/03* | (2006.01) |

(52) U.S. Cl.
CPC ............... *H01Q 1/243* (2013.01); *H01Q 1/38* (2013.01); *H01Q 1/48* (2013.01); *H04M 1/0266* (2013.01); *H04M 1/03* (2013.01)

(58) Field of Classification Search
CPC ......... H01Q 1/243; H01Q 5/364; H01Q 5/371
See application file for complete search history.

(56) References Cited

U.S. PATENT DOCUMENTS

| | | | | |
|---|---|---|---|---|
| 2018/0159221 A1* | 6/2018 | Liou | .................. | H01Q 9/42 |
| 2018/0366812 A1* | 12/2018 | Kim | .................. | H01Q 13/106 |
| 2019/0109622 A1* | 4/2019 | Wang | .................. | H04B 7/0452 |

FOREIGN PATENT DOCUMENTS

| | | |
|---|---|---|
| CN | 101719586 A1 | 6/2010 |
| CN | 108040310 A1 | 5/2018 |
| CN | 108110407 A1 | 6/2018 |

OTHER PUBLICATIONS

1st Office Action dated Dec. 19, 2019 by CNIPA in related Chinese Patent Application No. 201810604313.6 (46 Pages).

* cited by examiner

*Primary Examiner* — Daniel Munoz
(74) *Attorney, Agent, or Firm* — W&G Law Group LLP

(57) ABSTRACT

The present disclosure discloses an antenna system. The antenna system includes a circuit board having a feeding point, an RF switch, and a system ground. The antenna further includes a feeding portion electrically connected to the feeding point, a ground portion connected to the system ground by the RF switch, and a connecting portion connecting the feeding portion to the ground portion. The ground portion includes a first metal segment for connecting to the connecting portion, and a second metal segment; the feeding portion includes a third metal segment and a fourth segment. The RF switch electrically connects to the second metal segment, and the feeding point electrically connects to the fourth segment.

6 Claims, 4 Drawing Sheets

ANTENNA SYSTEM AND MOBILE TERMINAL USING SAME

FIELD OF THE PRESENT DISCLOSURE

The present disclosure relates to the field of communication technologies, and more particularly to an antenna system with decreased SAR value. The present disclosure also related to a mobile terminal using such an antenna system.

DESCRIPTION OF RELATED ART

With development of communication technologies, portable devices like tablets, laptops, mobile phones, are widely used. These devices are equipped with communication functions to communicate remotely with other ends. Antennas are more and more widely used to achieve such functions. An antenna is used for receiving electromagnetic waves and transmitting electromagnetic waves.

More and more mobile phones use metal back covers and are designed to be thinner and thinner. In such a mobile phone, a space for accommodating the antenna system is limited, and the radiation performance of the antenna system is suppressed by the metal back cover because of electromagnetic shielding caused by the metal back cover.

Therefore, an improved antenna system with smaller size and high performance is desired.

SUMMARY OF THE PRESENT DISCLOSURE

One of the primary objects of the present disclosure is to provide an antenna system having better performance with smaller clearance and smaller height.

Accordingly, the present disclosure provides an antenna system in a mobile terminal having a screen and a back cover forming a receiving space with the screen, comprising: a circuit board in the receiving space, having a feeding point, an RF switch, and a system ground; a feeding portion electrically connected to the feeding point, a ground portion connected to the system ground by the RF switch, and a connecting portion connecting the feeding portion to the ground portion; the ground portion including a first half-sealed space formed by extending counterclockwise from an end of the connecting portion; the feeding portion including a second half-sealed space formed by extending clockwise from another end of the connecting portion; the ground portion including a first metal segment at a starting end thereof for connecting to the connecting portion, and a second metal segment at an ending point thereof; the feeding portion including a third metal segment at a starting point thereof and a fourth segment at an ending point thereof; the RF switch electrically connecting to the second metal segment, and the feeding point electrically connected to the fourth segment; wherein the connecting portion extends along a short side of the mobile terminal, and the antenna system is formed on a surface opposite to the back cover.

Further, the back cover includes a main portion opposite to the screen and a side portion extending from an edge of the main portion toward the screen, the antenna system is formed on a first surface opposite to the main portion and/or a second surface opposite to the side portion.

Further, the mobile terminal further includes a speaker box having a first surface opposite to the main portion and a second surface opposite to the side portion; the speaker box further includes a sound aperture, the antenna system is formed on the first surface and the second surface of the speaker box.

Further, the mobile terminal further includes an antenna frame on which the antenna system is formed; the antenna frame includes a first surface opposite to the main portion and a second surface opposite to the side portion; the antenna system is formed on the first surface and the second surface; and the sound aperture of the speaker box is formed in the second surface.

Further, the connecting portion is formed on the first surface; the first metal segment extends from the connecting portion adjacent to the sound aperture to the second surface; the third metal segment extends from the connecting portion away from the sound aperture away from the second surface; the second and fourth metal segments are both arranged on the second surface.

Further, the connecting portion is formed on the first surface; the first metal segment extends from the connecting portion adjacent to the sound aperture to the second surface; the third metal segment extends from the connecting portion away from the sound aperture away from the second surface; the second and fourth metal segments are both arranged on the second surface.

Further, the ground portion further includes a fifth metal segment cooperatively forming the first half-sealing space, and the feeding portion further includes a sixth metal segment cooperatively forming the second half-sealing space.

Further, the fifth metal segment includes a first part connecting with the first metal segment and surrounding the sound aperture, and a second part extending from the first part toward the first surface; the second part connects to the second metal segment.

Further, the sixth metal segment includes a third part extending from the third metal segment away from the sound aperture, a fourth part extending from the third part to the second surface, a fifth part extending from the fourth part toward the sound aperture, and a sixth part extending from the fifth part toward the first surface; the sixth part connects to the fourth metal segment.

Further, the antenna system is formed on the second surface by LDS process.

The present disclosure further provides a mobile terminal including an antenna system described above.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
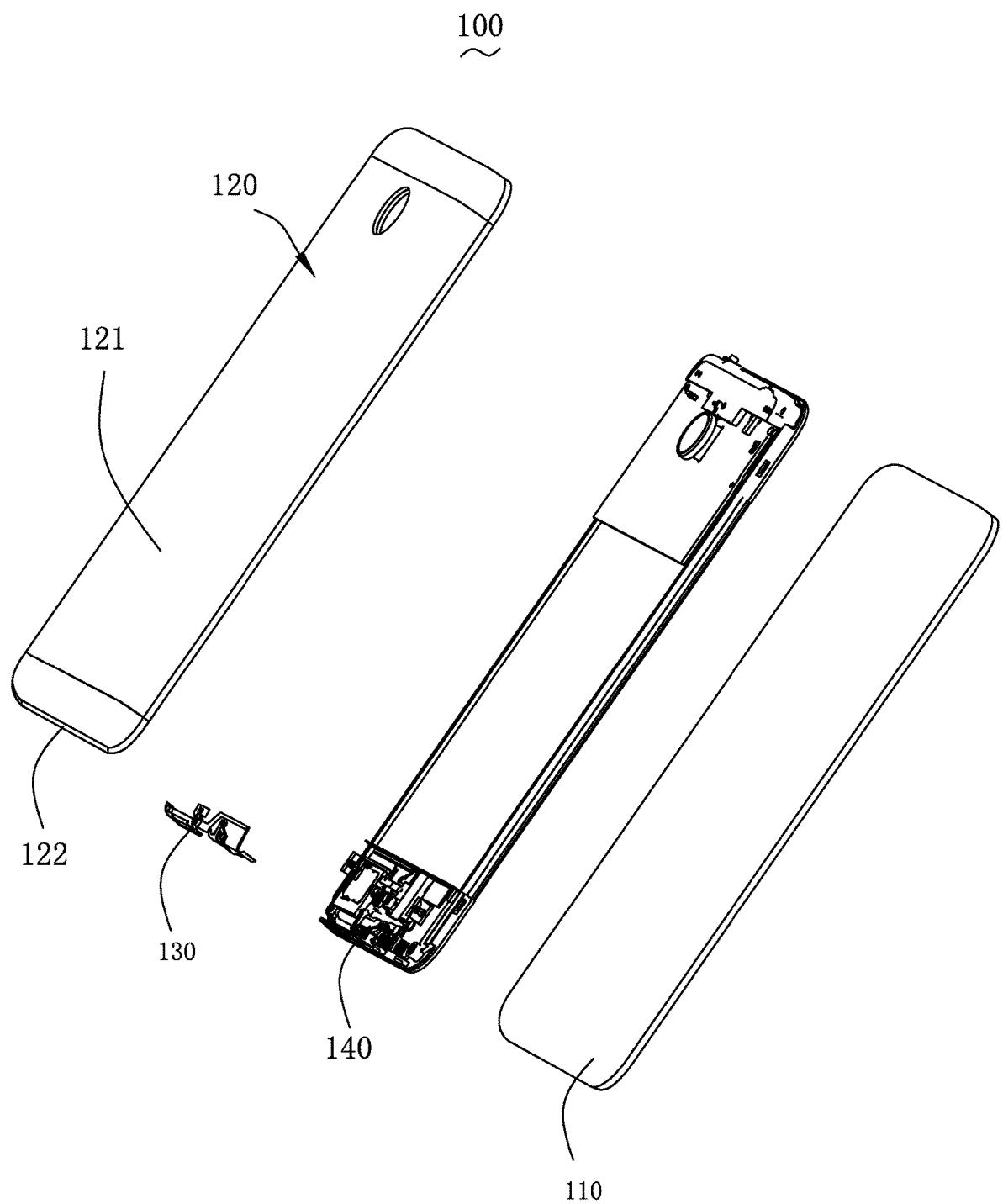
FIG. 1 is an exploded view of a mobile terminal in accordance with an exemplary embodiment of the present disclosure.
Figure 2:
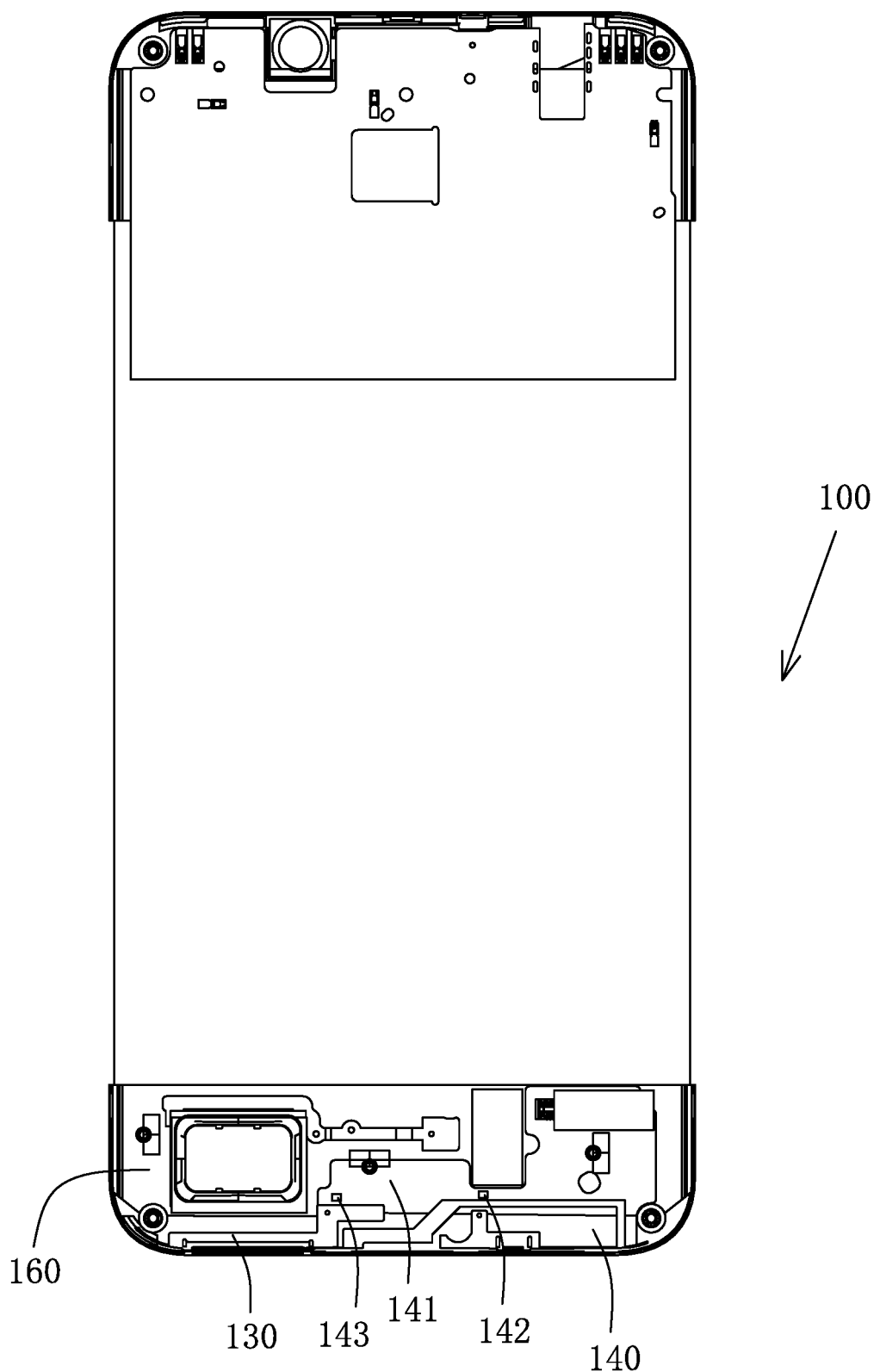
FIG. 2 is an illustrative layout of an antenna system used in the mobile terminal in FIG. 1.

Referring to FIGS. 1-2, an antenna system is used in a mobile terminal, like a mobile phone. In the embodiment, the mobile terminal 100 is a mobile phone. As shown un FIGS. 1-2, the mobile terminal 100 includes a screen 110, a back cover 120 cooperatively forming a receiving space with the screen 110, an antenna system 130 accommodated in the receiving space, and a circuit board 140 in the receiving space. The circuit board 140 includes an RF switch 143, a feeding point 142, and a system ground 141. In the embodiment, the antenna system 130 is formed on a surface opposed to the back cover 120.

The back cover 120 includes a main portion 12 opposite to the screen 110 and a side portion 122 extending from an edge of the main portion 121 toward the screen 110. The antenna system 130 is formed on a first surface opposite to the main portion 121 and/or a second surface opposite to the side portion 122.

Figure 3A:
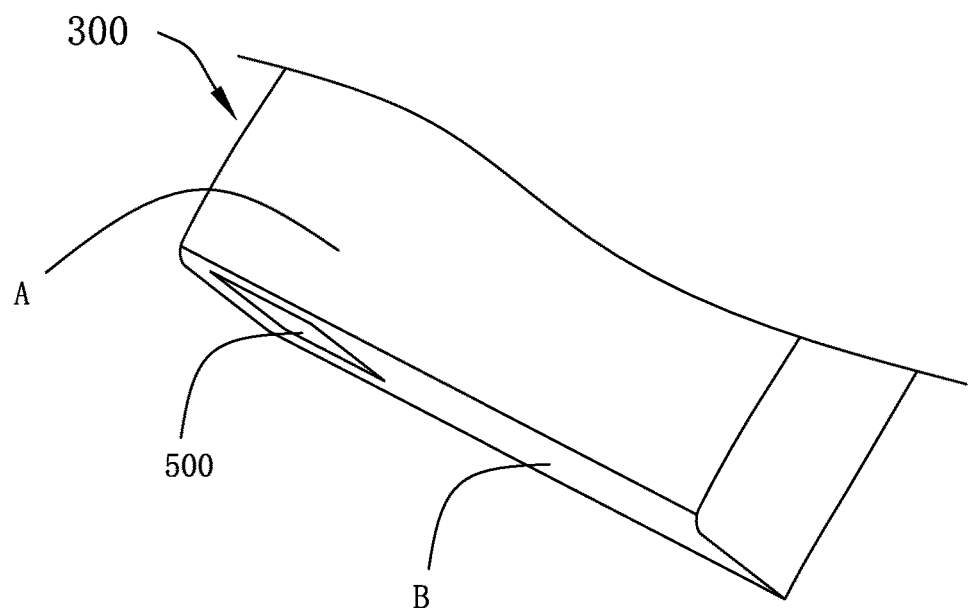
FIG. 3a is an illustration of a speaker box.

In one embodiment, as shown in FIG. 3a, the mobile terminal further includes a speaker box 300 having a first surface A opposite to the main portion 121 and a second surface B opposite to the side portion 122. The speaker box 300 further includes a sound aperture 500. The antenna system 130 is formed on the first surface A and the second surface B of the speaker box.

Figure 3B:
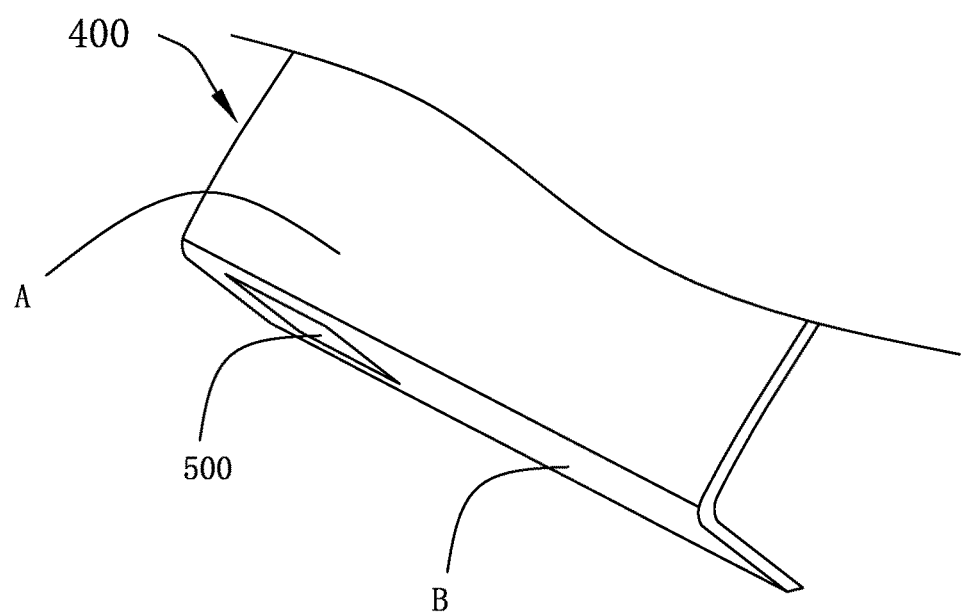
FIG. 3b is an antenna frame in the mobile terminal.

In an alternative embodiment, as shown in FIG. 3b, the mobile terminal further includes an antenna frame 400 on which the antenna system 130 is formed. The antenna frame 400 includes a first surface A opposite to the main portion 121 and a second surface B opposite to the side portion 122. The antenna system 130 is formed on the first surface A and the second surface B. And, the sound aperture 500 of the speaker box is formed in the second surface B.

Figure 4:
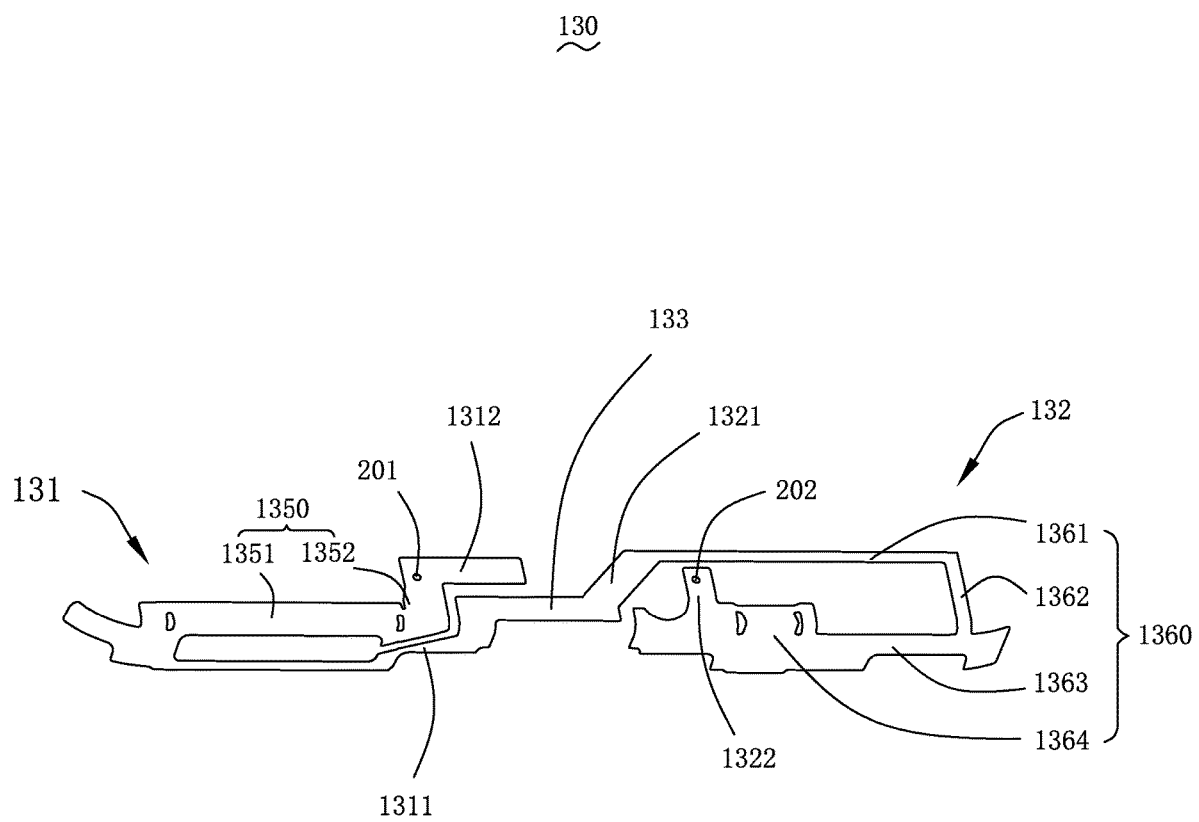
FIG. 4 is an isometric view of the antenna system of the exemplary embodiment of the present disclosure.

As shown in FIG. 4, the antenna system includes a feeding portion 132, a ground portion 131 electrically connected to the system ground 141, and a connecting portion 133 connecting the feeding portion 132 and the ground portion 131. The ground portion 131 electrically connects to the system ground 141 by the RF switch 143.

Referring to FIGS. 2 and 4, the connecting portion 133 extends along a short side of the mobile terminal 100. The ground portion 131 includes a first half-sealed space formed by extending counterclockwise from an end of the connecting portion 133. The feeding portion 132 includes a second half-sealed space formed by extending clockwise from another end of the connecting portion 133. The ground portion 131 includes a first metal segment 1311 at a starting end thereof for connecting to the connecting portion 133, and a second metal segment 1312 at an ending point thereof. In addition, the feeding portion 132 includes a third metal segment 1321 at a starting point thereof for connecting the connecting portion 133 and a fourth segment 1322 at an ending point thereof. The second metal segment 1312 includes a first connecting point 201, and the fourth metal segment 1322 includes a second connecting point 202. The RF switch 143 is connected to the second metal segment 1312 via the first connecting point 201, and the feeding point 142 connects to the fourth metal segment 1322 via the second connecting point 202.

The antenna system provide by the present disclosure has a better performance with small clearance, smaller height.

In the embodiment, the connecting portion 133 is formed on the first surface A. The first metal segment 1311 extends from the connecting portion 133 adjacent to the sound aperture 500 to the second surface B. The third metal segment 1321 extends from the connecting portion 133 away from the sound aperture 500 away from the second surface B. The second and fourth metal segments 1312, 1322 are both arranged on the second surface B.

The ground portion 131 further includes a fifth metal segment 1350 cooperatively forming the first half-sealing space, and the feeding portion 132 further includes a sixth metal segment 1360 cooperatively forming the second half-sealing space.

The fifth metal segment 1350 includes a first part 1351 connecting with the first metal segment 1311 and surrounding the sound aperture 500, and a second part 1352 extending from the first part 1351 toward the first surface A. The second part 1352 connects to the second metal segment 1312.

The sixth metal segment 1360 includes a third part 1361 extending from the third metal segment 1321 away from the sound aperture 500, a fourth part 1362 extending from the third part 1361 to the second surface B, a fifth part 1363 extending from the fourth part toward the sound aperture 500, and a sixth part 1364 extending from the fifth part 1363 toward the first surface A. The sixth part 1364 connects to the fourth metal segment 1322.

In the embodiment, the antenna system is formed by Laser Direct Structuring (LDS) process using LDS materials. LDS material is an improved plastic material containing organic metal compounds. After being processed by laser, the organic metal compounds will release metal particles. By LDS process, a circuit board formed on the LDS material by laser can serve as an antenna used in a portable device.

The mobile terminal 100 further includes a metal frame 160. The first surface A is located between the circuit board and the main body 121. The metal frame 160 forms a distance to the side portion 122 not greater than 5 mm. A distance between the system ground and the side portion 122 is not greater than 5 mm. A distance between the first surface A and the circuit board 140 is not greater than 3 mm.

In the embodiment, a length-width ratio of the screen is 18:9.

The antenna system provide by the present disclosure has a better performance with small clearance, smaller height. The antenna system is capable of working at frequency bands 790 MHz~960 MHz, 1710 MHz~2690 MHz.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An antenna system in a mobile terminal having a screen and a back cover forming a receiving space with the screen, comprising: a circuit board in the receiving space, having a feeding point, an RF switch, and a system ground; a feeding portion electrically connected to the feeding point, a ground portion connected to the system ground by the RF switch, and a connecting portion connecting the feeding portion to the ground portion; the ground portion including a first half-sealed space formed by extending counterclockwise from an end of the connecting portion; the feeding portion including a second half-sealed space formed by extending clockwise from another end of the connecting portion; the ground portion including a first metal segment at a starting end thereof for connecting to the connecting portion, and a second metal segment at an ending point thereof, the feeding portion including a third metal segment at a starting point thereof and a fourth segment at an ending point thereof, the RF switch electrically connecting to the second metal segment, and the feeding point electrically connected to the fourth segment; wherein the connecting portion extends along a short side of the mobile terminal, the back cover includes a main portion opposite to the screen and a side portion extending from an edge of the main portion toward the screen; the mobile terminal further includes a speaker box having a first surface opposite to the main portion and a second surface opposite to the side portion; the speaker box further includes a sound aperture formed in the second surface, the antenna system is formed on the first surface and the second surface of the speaker box; the antenna system is integral with the sound aperture.

2. The antenna system as described in claim 1, wherein the connecting portion is formed on the first surface; the first metal segment extends from the connecting portion adjacent to the sound aperture to the second surface; the third metal segment extends from the connecting portion away from the sound aperture away from the second surface; the second and fourth metal segments are both arranged on the second surface.

3. The antenna system as described in claim 2, wherein the ground portion further includes a fifth metal segment cooperatively forming the first half-sealing space, and the feeding portion further includes a sixth metal segment cooperatively forming the second half-sealing space.

4. The antenna system as described in claim 3, wherein the fifth metal segment includes a first part connecting with the first metal segment and surrounding the sound aperture, and a second part extending from the first part toward the first surface; the second part connects to the second metal segment.

5. The antenna system as described in claim 3, wherein the sixth metal segment includes a third part extending from the third metal segment away from the sound aperture, a fourth part extending from the third part to the second surface, a fifth part extending from the fourth part toward the sound aperture, and a sixth part extending from the fifth part toward the first surface; the sixth part connects to the fourth metal segment.

6. The antenna system as described in claim 1 formed on the second surface by LDS process.

* * * * *